July 29, 1930.  J. T. NORMAN  1,771,813
WAGON
Filed Dec. 13, 1928  2 Sheets-Sheet 1
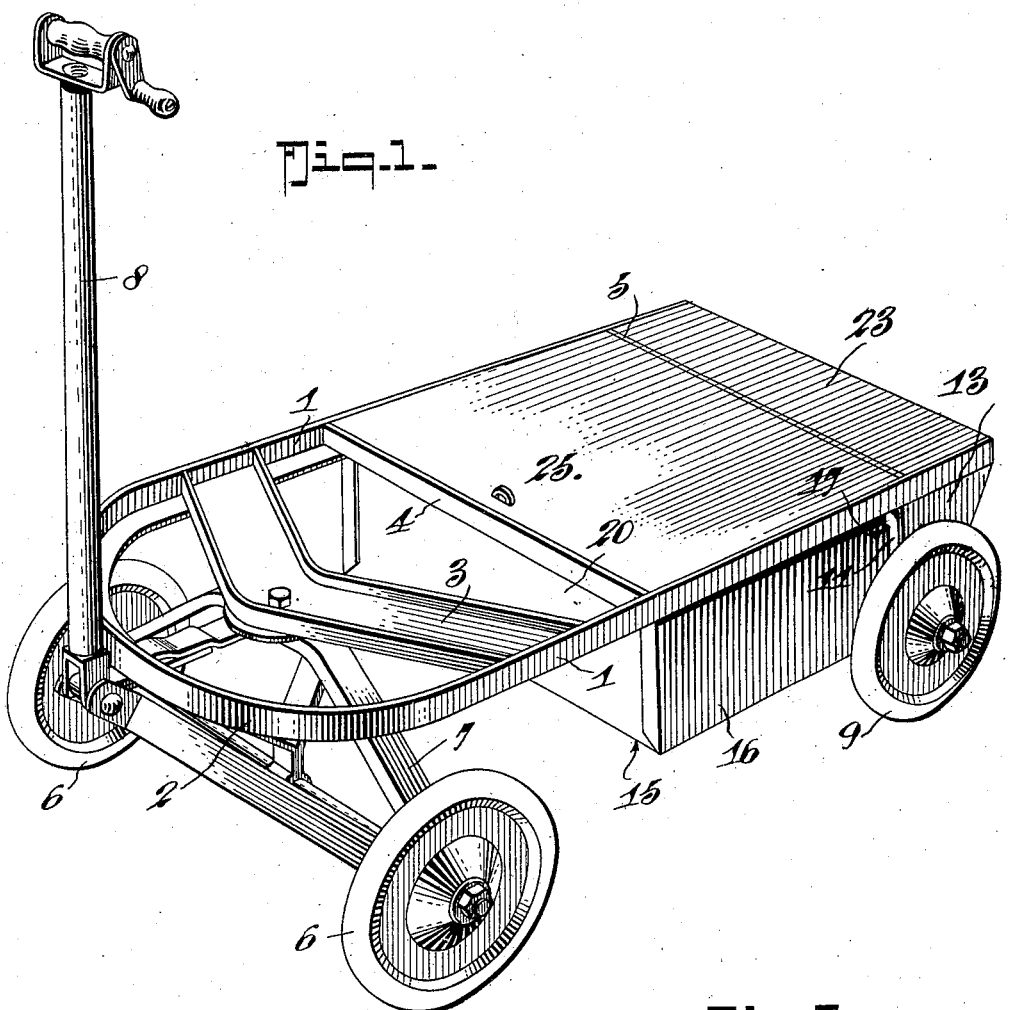
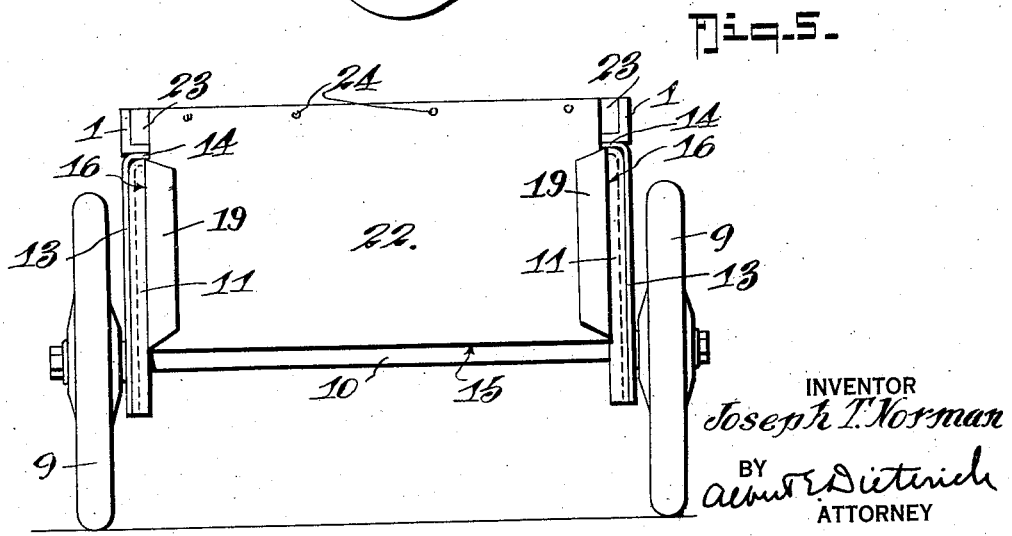
INVENTOR
Joseph T. Norman
BY
Albert E. Dieterich
ATTORNEY

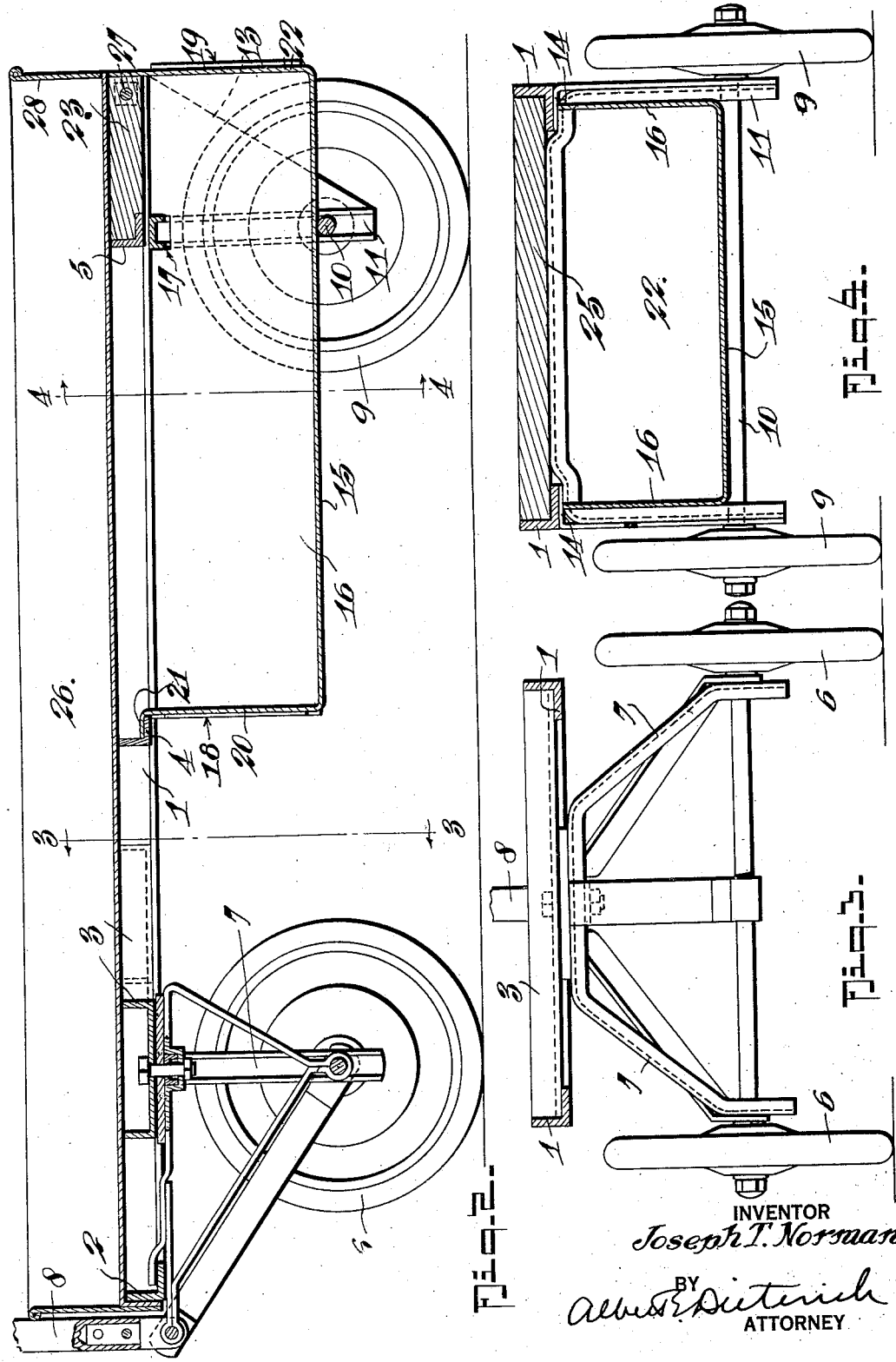

Patented July 29, 1930

1,771,813

UNITED STATES PATENT OFFICE

JOSEPH T. NORMAN, OF FREDERICK, MARYLAND, ASSIGNOR TO THE NORMAN MANUFACTURING COMPANY, OF FREDERICK, MARYLAND, A CORPORATION OF MARYLAND

WAGON

Application filed December 13, 1928. Serial No. 325,862.

My invention relates to wagons of the type disclosed in my Letters Patent No. 1,627,109, issued May 3, 1927, and it particularly has for its object to provide a chassis with an underslung box-like body which may be used alone or in connection with a dump body or other type of body mounted under the chassis.

Further, the invention has for an object to provide an underslung body which will serve as a box in which the wheels and hardware of the wagon may be packed during shipment and one which may be held in place in a manner to permit its ready removal if desired.

Further, it is an object to provide an underslung body with a two-part cover, the fore part of which may be removed in its entirety while the rear part is retained as a seat.

Other objects will in part be obvious and in part be pointed out hereinafter.

To the attainment of the aforesaid objects and ends, my invention consists in the novel details of construction and in the combination, connection and arrangement of parts, hereinafter more fully described and then pointed out in the claims.

In the drawing:

Figure 1 is a perspective view of a wagon embodying my invention.

Figure 2 is a vertical longitudinal section of the same, a dump body being shown in combination with the underslung body.

Figure 3 is a cross section on the line 3—3 of Figure 2, the dump body being omitted.

Figure 4 is a cross section on the line 4—4 of Figure 2, the dump body being omitted.

Figure 5 is a rear elevation of the parts shown in Figure 2.

In the drawing in which like numerals of reference indicate like parts in all of the figures, 1 represents the side bars of the chassis frame which are preferably constructed of angle iron and united at the front by a curved portion 2.

3 represents a V-shaped combined fifth wheel and brace member, the ends of which are secured to the side bars 1 at the front as shown.

There are also provided an intermediate cross bar 4 and a rear cross bar 5 connecting the side bars 1. Front wheels 6 on a carriage 7 support the fore part of the chassis frame which may be drawn by a draft pole 8.

The fore part of the wagon per se constitutes no part of my present invention but is embodied in the subject matter of my application filed December 15, 1928, Serial No. 326,380.

Rear wheels 9 mounted upon a rear wheel axle 10 sustain the rear portion of the chassis frame through the medium of a supporting yoke 11. To this yoke 11 is secured side brace plate angles 13 having flanges 14 which are secured to the bars 1 and to the upright portions of the yoke 11 by spot welding or other suitable means.

The underslung body comprises a bottom 15, sides 16, the latter being notched as at 17 to permit passage of the yoke 11, a front wall 20 and a rear wall 22. The side walls 16 have front and back flanges 18 and 19 respectively which are spot welded or otherwise suitably secured to the front and back walls of the body when the body is made of metal. The front wall of the body has a flange 21 to rest on the intermediate cross bar 4 while the rear wall 22 extends upwardly and is secured at 24 to the rear section 23 which constitutes a partial cover for the body and also serves as a seat when the dump body 26 is not used.

The remainder of the underslung body is closed at the top by a removable cover 25 that rests on the frame bars 1 and on the intermediate cross brace 4.

The dump body 26 has a bottom and side walls as well as a tail gate 28 and is pivoted to the chassis frame by a pivot rod 27 that passes through the rear ends of the bars 1 and through the cover-seat section 23.

The construction of the dump body per se constitutes no part of the present invention as it may be essentially the same as that disclosed in my patent or in my application hereinbefore referred to.

It will be seen that with my present construction in packing the wagon for shipment the wheels and axles may be placed in the underslung body in which they are retained when the cover is in place. This facilitates packing and shipment and prevents loss of the wheels and axles and the immediately related parts thereof.

When used with a dump wagon body the removable cover 25 may or may not be used as preferred. If not used the bottom of the dump body serves as a closure for the underslung body.

It will be seen that by my construction the side walls of the underslung body lie beneath the bars 1, the front wall lies with its flange over the intermediate cross bar or brace 4, and by reason of the notches in the side walls which permit passage of parts of the yoke, the body can have no forward and backward movement on the chassis frame. As the body fits between the vertical members of the yoke and above the axle no up and down movement can take place and no lateral movement. Thus it is unnecessary to provide any special means for securing the underslung body in place but if desired the back wall may be tacked or screwed to the cover section 23, thus serving the twofold purpose of preventing any rattling of the body and also retaining the portion 23 of the cover against removal.

In order to remove the underslung body it is only necessary to withdraw these latter securing means (if the same are used) and to withdraw the rear axle, whereupon the underslung body can be dropped clear of the frame and thus removed, after which the axle may be replaced and the wheels put on. The advantage of tacking the rear wall of the underslung body to the cover-seat section 23 is that it will hold the underslung body in place during shipment while the rear axle is located within the body for shipping purposes.

From the foregoing description, taken in connection with the accompanying drawing, it is thought the construction, operation and advantages of my invention will be clear to those skilled in the art to which it relates.

What I claim is:

1. In a wagon, a chassis frame, a wheeled carriage on which the front of said frame is mounted, a rear axle yoke beneath said frame, a rear axle carried by said yoke, wheels on said axle and a box-like body located below and secured to said frame and located above said rear axle within said yoke.

2. In wagons, a chassis frame, a wheeled carriage on which the fore part of said frame is mounted, a rear axle carrier mounted beneath said frame and including upright portions, a rear axle with wheels carried by the upright portions of said carrier, angular brace plates secured to said upright portions and to said frame, a pair of cross bars connecting the sides of said frame and constituting parts thereof, and an underslung body secured to one of said cross bars and overlying said rear axle, substantially as specified.

3. In wagons, a chassis frame, a wheeled carriage on which the fore part of said frame is mounted, a rear axle carrier mounted beneath said frame and including upright portions, a rear axle with wheels carried by the upright portions of said carrier, angular brace plates secured to said upright portions and to said frame, a pair of cross bars connecting the sides of said frame and constituting parts thereof, an underslung body secured to one of said cross bars and overlying said rear axle, and a dump body mounted on said frame over said underslung body and constituting a cover therefor.

4. In wagons, a chassis frame, a wheeled carriage on which the fore part of said frame is mounted, a rear axle carrier mounted beneath said frame and including upright portions, a rear axle with wheels carried by the upright portions of said carrier, angular brace plates secured to said upright portions and to said frame, a pair of cross bars connecting the sides of said frame and constituting parts thereof, an underslung body secured to one of said cross bars and overlying said rear axle, a combined cover member and seat member mounted in said frame across over the back of said body.

5. In wagons, a chassis frame, a wheeled carriage on which the fore part of said frame is mounted, a rear axle carrier mounted beneath said frame and including upright portions, a rear axle with wheels carried by the upright portions of said carrier, angular brace plates secured to said upright portions and to said frame, a pair of cross bars connecting the sides of said frame and constituting parts thereof, an underslung body secured to one of said cross bars and overlying said rear axle, a combined cover member and seat member mounted in said frame across over the back of said body, and a removable cover for the remainder of said body resting on said frame.

6. In wagons, a chassis frame, a wheeled carriage on which the fore part of said frame is mounted, a rear axle carrier mounted beneath said frame and including upright portions, a rear axle with wheels carried by the upright portions of said carrier, angular brace plates secured to said upright portions and to said frame, a pair of cross bars connecting the sides of said frame and constituting parts thereof, an underslung body secured to one of said cross bars and overlying said rear axle, a combined cover member and seat member mounted in said frame across over the back of said body, a removable cover for the remainder of said body resting on said frame, and a dump body mounted on said frame over said covers, said dump body being adapted to be lifted to allow access to said underslung body and its removable cover.

7. In wagons, a chassis frame of parallel bars united at the front by a curved section and mounted at the front on a wheeled carriage, a rear wheel yoke comprising a transverse portion extending from one parallel frame bar across to the other and further comprising vertical standards, a rear wheel axle mounted on said standards, rear wheels on said axle, a cross plate carried by said parallel bars at their rear, an underslung box-like body located below said frame and above said axle and having a bottom, sides, front and back walls, the back wall being secured to said cross plate, said front wall having a flange, a cross bar connecting said parallel bars, said front wall flange adapted to rest on said cross bar, and said side walls having recesses for the reception of portions of said yoke, substantially as described.

8. In wagons, a chassis frame of parallel bars united at the front by a curved section and mounted at the front on a wheeled carriage, a rear wheel yoke comprising a transverse portion extending from one parallel frame bar across to the other and further comprising vertical standards, a rear wheel axle mounted on said standards, rear wheels on said axle, a cross plate carried by said parallel bars at their rear, an underslung box-like body located below said frame and above said axle and having a bottom, sides, front and back walls, the back wall being secured to said cross plate, said front wall having a flange, a cross bar connecting said parallel bars, said front wall flange adapted to rest on said cross bar, and said side walls having recesses for the reception of portions of said yoke, and a removable cover resting in said frame and on said flange for the purposes specified.

JOSEPH T. NORMAN.